J. LOWE.
GAS GENERATING PLANT.
APPLICATION FILED OCT. 11, 1919.

1,416,042. Patented May 16, 1922.

Inventor:
James Lowe
By Lawrence Langner
Attorney

UNITED STATES PATENT OFFICE.

JAMES LOWE, OF AUCKLAND, NEW ZEALAND.

GAS-GENERATING PLANT.

1,416,042.  Specification of Letters Patent.  Patented May 16, 1922.

Application filed October 11, 1919. Serial No. 330,041.

*To all whom it may concern:*

Be it known that I, JAMES LOWE, a subject of His Majesty the King of the United Kingdom of Great Britain and Ireland, resident of the city of Auckland, in the Provincial District of Auckland and Dominion of New Zealand, have invented a new and useful Improvement in Gas-Generating Plants, of which the following is a specification.

The object of this invention is to provide means of producing a continuous stream of blue water gas thus avoiding the use of a relief gasholder and facilitating the introduction of hot newly made water gas to coal gas during the process of manufacture of the same and to cause the producer gas which results from blowing the generators with air in the manufacture of water gas to be given off continuously, thus making the producer gas available for use in furnaces for heating gas retorts or in any other type of furnace.

The desired effect is obtained by providing a plant consisting of two bricklined water gas generators or producers (twin generators) arranged so that blue water gas is made in one generator in the usual way while the fire of the other generator is being revivified with air.

Two flues or pipes common to both generators are provided, one for conveying the water gas and the other for conveying the producer gas. Each generator is provided with an air valve, a steam valve, a water gas outlet damper or valve, and a producer gas outlet damper or valve connected together by linkwork or gearing so that while the steam valve and water gas damper are open on one generator, the air valve and producer gas damper are closed on the same generator but open on the other generator. These valves and dampers are preferably arranged to operate automatically at predetermined intervals by suitable mechanism.

Valves for regulating air and steam are provided on the air and steam pipes, and dampers for shutting down are also provided on the water gas and producer gas flues or pipes.

An embodiment of the invention is illustrated in the accompanying drawing in which.

Figures 1, 2, 3:
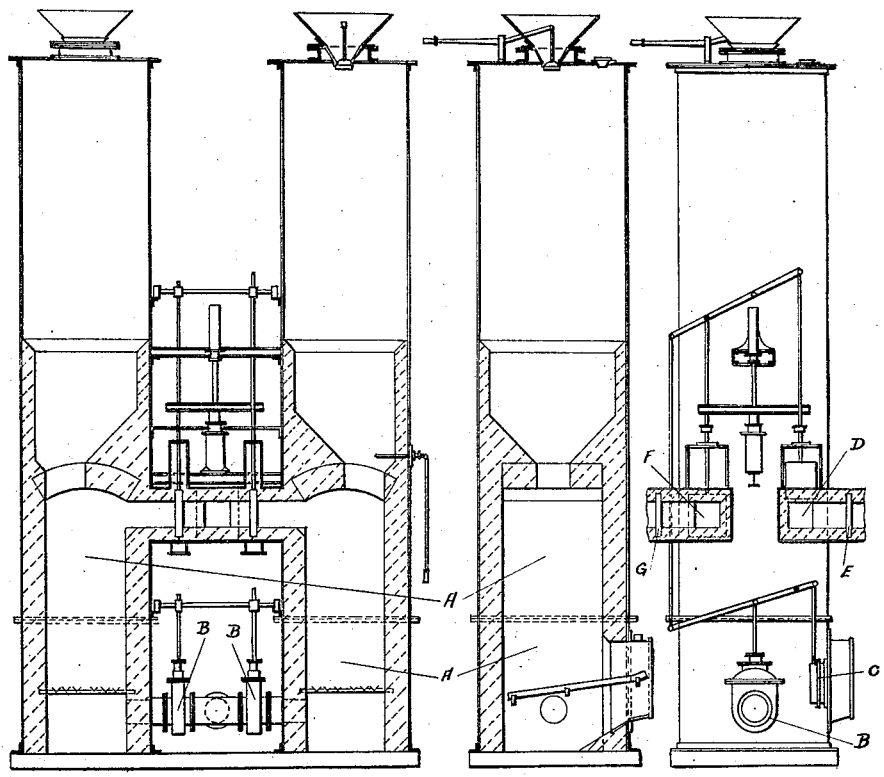
Figure 1 is a transverse vertical section through one unit of the plant consisting of two generators or producers.
Figure 2 is a vertical sectional view of one generator, at right angles to Fig. 1.
Figure 3 is a side elevation showing valves and dampers and also the flues in section.
Figure 4:
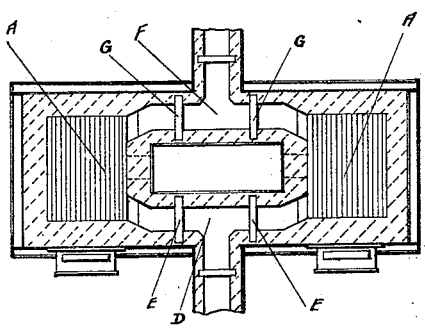
Figure 4 is a horizontal section on a plane cutting the water gas and producer gas flues.

The bricklined generators or producers A are provided with a flue or pipe F for conveying the water gas made during the gas making periods, to the retorts, which flue or pipe has the valves or dampers G for the purpose of controlling the flow of gas from either generator; and said generators or producers are also provided with a flue or pipe D having therein valves or dampers E for conveying the producer gas made in the periods of revivification to the furnaces or to any desired place.

Each generator is provided with an air valve B and a steam valve C.

The valves and dampers B, C, E and G, are preferably connected together, so that while the steam valve C and the water gas damper G are open on a generator, the air valve B and the producer gas damper E are closed on the same generator, but open on the other generator.

In operation, steam is admitted into one generator through the valve C and water gas is formed therein; the valve or damper G being open, the water gas is conveyed to the retorts. In the other generator, air is being admitted through the valve B and producer gas is formed; the valve or damper E is open and the gas is conveyed to the furnace. Then in the first generator the valve C is closed and the valve B opened and the damper or valve G is closed and valve or damper E is opened and producer gas is made. The opposite happens in the other generator and water gas is formed.

It would entail immense labor to show by drawings the various types of gas retorts at present in use to all of which the improved gas plant herein disclosed would be applicable.

Installations of gas retorts are of many descriptions and are well known to those skilled in the gas making art. Further, the use of the present invention in conjunction with an installation of gas retorts does not alter the installation of gas retorts in any way. Modern settings of gas retorts are usually heated by producer gas. Usually this producer gas for heating the retorts is generated in a furnace which forms part of the gas retort setting; but this is not always the case as it is sometimes generated in producers a considerable distance away and is conveyed in ducts or flues to the retort setting. Producer gas is a waste product in existing water gas plants chiefly for the reason that it is given off intermittently, and it is discharged into the air, as it can not be easily utilized when it is given off in intermittent blasts.

What I desire to claim and secure by Letters Patent is:—

1. In a plant for the continuous, simultaneous manufacture of water gas and producer gas, the combination of a pair of co-ordinate, companion producers disposed side by side; an outlet flue for the producer gas located at one side of the producers and communicating with both of them; a separate outlet flue for the water gas located at the opposite side of the producers and likewise in communication with both of them; damper means associated with each of said flues to open either flue and simultaneously close the other; a steam valve and an air valve for each producer; and operating connections between said steam and air valves and said damper means for simultaneously opening the steam valve and water gas damper of either producer and closing those of the other producer, and for simultaneously closing the air valve and producer gas damper means of the first producer and opening those of the second producer.

2. In a plant for the continuous simultaneous and separate manufacture of water gas and producer gas, the combination of a pair of companion, co-ordinate producers disposed side by side; an outlet flue for the producer gas communicating with one side of both producers; a separate outlet flue for the water gas communicating with the opposite side of both producers; and mechanism for admitting steam to either producer for the generation of water gas therein and simultaneously admitting air to the other producer to generate producer gas therein, while at the same time opening communication between the first producer and the outlet flue for the water gas, and between the second producer and the producer gas outlet flue, and closing communication between said first producer and the producer gas outlet flue and between said second producer and the water gas outlet flue.

JAMES LOWE.

Witnesses:
 MARY CHRISTINA BRENNAN,
 ARTHUR CLIFTON AXFORD SEATON.